United States Patent [19]

Bullock et al.

[11] Patent Number: 4,833,925
[45] Date of Patent: May 30, 1989

[54] BEARINGLESS FLOWMETER

[75] Inventors: James B. Bullock, Palm Harbor; Agustin M. Azel, Safety Harbor, both of Fla.

[73] Assignee: Baxter International Inc., Deerfield, Ill.

[21] Appl. No.: 47,862

[22] Filed: May 8, 1987

[51] Int. Cl.⁴ .................................................. G01F 1/06
[52] U.S. Cl. .................................................. 73/861.79
[58] Field of Search ........... 73/861.33, 861.32, 861.35, 73/253, 272, 861.81, 861.79

[56] References Cited

U.S. PATENT DOCUMENTS

| 3,447,373 | 5/1969 | McNabb | 73/861.33 |
| 3,721,505 | 3/1973 | Garnett | 73/861.32 |
| 3,927,568 | 12/1975 | Hoppe | 73/861.33 |
| 3,937,081 | 2/1976 | Dabanian et al. | 73/861.33 |
| 4,015,474 | 4/1977 | Hoppe | 73/861.33 |
| 4,047,433 | 9/1977 | Dabanian | 73/861.33 |
| 4,655,090 | 4/1987 | Rousseau | 73/861.81 |

Primary Examiner—Stewart J. Levy
Assistant Examiner—Robert P. Bell
Attorney, Agent, or Firm—Paul C. Flattery; Macdonald J. Wiggins; Charles R. Mattenson

[57] ABSTRACT

A bearingless flowmeter having a ring rotor disposed in a vortex chamber having a plurality of jets spaced circumferentially around the chamber has the ring rotor unbalanced thereby producing a single wobble mode of rotation.

12 Claims, 2 Drawing Sheets

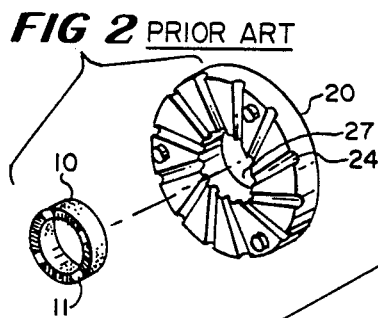
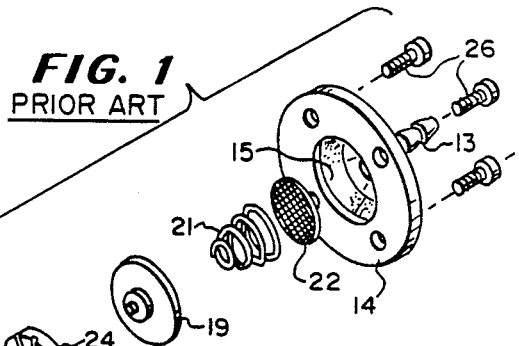
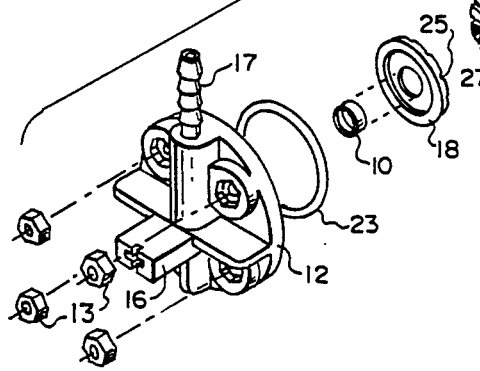
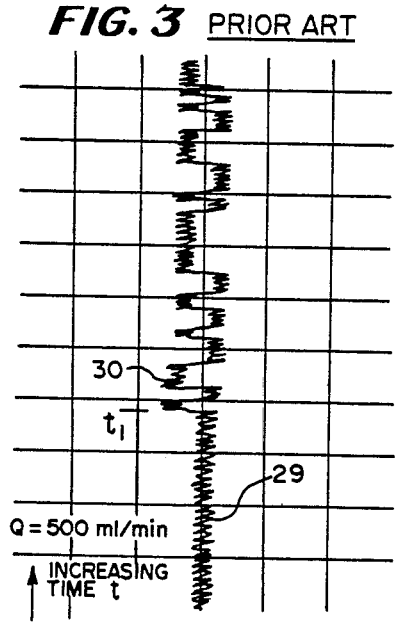
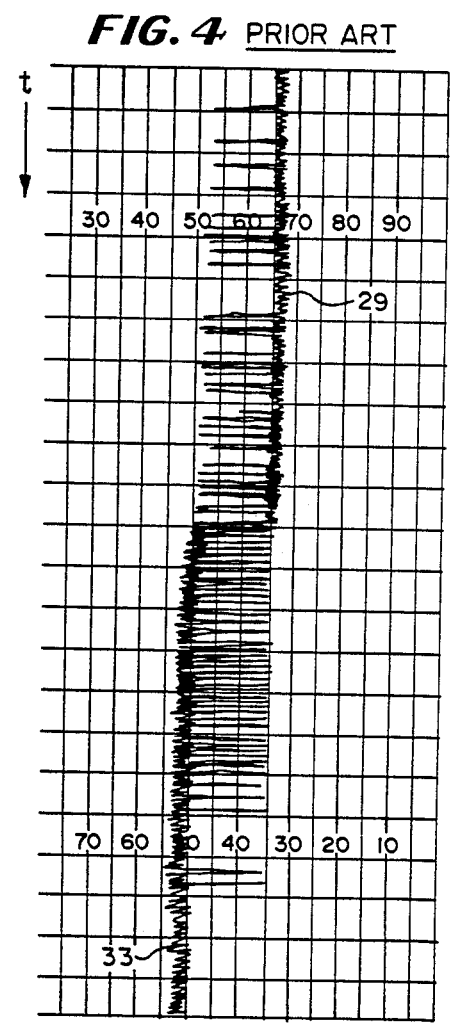

BEARINGLESS FLOWMETER

BACKGROUND OF THE INVENTION

1. Field of the Invention

The present invention relates to a bearingless flowmeter, and more particularly to an improvement providing a single mode of rotation of the rotor element thereof.

2. Description of the Prior Art

A bearingless flowmeter is described in U.S. Pat. No. 3,447,373 to McNabb with improvements thereto shown in U.S. Pat. Nos. 3,927,568 and 4,015,474, to Hoppe.

This type of flowmeter utilizes a ring rotor disposed in a vortex chamber having a plurality of symmetrically spaced jets circumferentially around the chamber. A fluid flowing through the jets causes a rotation of the rotor with a rate of rotation proportional to the rate of flow of the fluid.

The bearingless flowmeter has been used in a kidney dialysis apparatus which extracts fluid from a patient's blood. In such apparatus, a dialysis solution is passed through a dialyzer separated from the blood by a semi-permeable membrane. The pressure on the solution side is automatically controlled to cause water and low molecular weight solutes to pass from the blood through the membrane into the dialysate at a specified rate. A first flowmeter is disposed at the dialysate input of the dialyzer and measures the input flow rate thereof, which may be on the order of 500 ml per minute. A second flowmeter at the output measures the dialysate and removed fluid flow rate. The removed fluid typically produces an additional flow of one-tenth of the dialysate flow; for example, the total flow at the output of the dialyzer may be 550 ml per minute.

If the preselected difference in input and output rates is not achieved, the control system will change the differential pressure across the membrane to achieve such difference. If the flowmeters produce an erroneous reading, the control system will attempt to correct the apparent improper flow with possible serious consequences to the patient.

It is thus important that, after initial calibration performed before a dialysis treatment begins, the flowmeters remain stable. However, in dialysis apparatus using the above-described system, a serious problem has been noted. On occasions, certain discontinuities in the reading of a bearingless flowmeter occur during periods of constant flow. Two types of discontinuities have been noticed. The first is a step change and the second is a change having a finite transition time. Such changes always indicate a decrease in flow even though the flow rate is actually constant.

Various tests have been performed in an attempt to isolate the source of this problem. Not every flowmeter exhibited such discontinuities during testing. However, placing the ring rotor from a meter having the problem into another problem-free meter has shown that the problem follows the ring rotor. It is therefore theorized that slight imbalances in the ring rotor result in wobbling of the rotor when a resonance in the system occurs. Further, it appears that it is difficult to manufacture the ring rotor with sufficient uniformity to prevent slight imbalances from occurring.

Thus, there is a need for an improved bearingless flowmeter that will not exhibit the above-discussed problem.

SUMMARY OF THE INVENTION

It has been found experimentally that utilizing a ring rotor inherently unbalanced provides a solution to the discontinuities observed with ring rotors having only a slight unbalance. Thus, by increasing the imbalance of a ring rotor found to produce the above described problem, the flowmeter appears to operate in a single wobble mode and does not periodically shift from a fundamental mode to the wobble mode. Several different methods have been investigated which produce imbalanced ring rotors that do not exhibit the discontinuities previously observed. It appears that the wobbling becomes a stable mode of operation and therefore eliminates any transitions between dual modes.

The ring rotor is given a slight unbalance by making the inside diameter and the outside diameter thereof eccentric which produces a thicker wall on one side than on the opposite side. Other constructions of the ring rotor which will produce the same result include: irregularities in the distribution of material; variations in the diameters or lengths of the jetways around the rotor; molding the rotor from non-uniform materials; application of a small amount of material to the face of the ring rotor at one point in the circumference; and forming the ring rotor to have a slight wedge shape.

It is therefore a principal object of the invention to provide a modified ring rotor design in a bearingless flowmeter which will produce a constant single dynamic characteristic when spinning.

It is another object of the invention to provide a bearingless flowmeter which will not produce step or gradual discontinuities in the speed of rotation of the rotor thereof during periods of constant flow.

These and other objects and advantages of the invention will become apparent from the following detailed description when read in conjunction with the drawings.

BRIEF DESCRIPTION OF THE DRAWINGS

FIG. 1 is an exploded view of a prior art bearingless flowmeter exhibiting the problems which the present invention overcomes;

FIG. 2 is an enlarged view of the ring rotor and a portion of the vortex chamber and jetways of the prior art flowmeter;

FIG. 3 is a recording of the rotational speed of a ring rotor under test illustrating step discontinuities in the speed thereof during a constant flow rate;

FIG. 4 is a recording of the rotational speed of a ring rotor having a gradual transition of speed during a constant flow rate;

DETAILED DESCRIPTION OF THE PREFERRED EMBODIMENT

Figure 5:
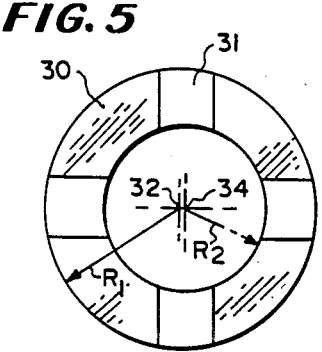
FIG. 5 is a plan view of a ring rotor of the invention having eccentric inner and outer diameters.

Referring to FIG. 1, an exploded view of a typical bearingless flowmeter known in the prior art is shown. Body section 14 includes a cavity 15 into which jet rings 20, 25 and ring rotor 10 are disposed. Body sections 14 and 12 are bolted together by bolts 26 and nuts 13, and have an inlet port 9 and an outlet port 17, respectively. A female jet ring 18 and a male jet ring 20 are mated such that a plurality of jetways is formed by grooves 24 and 25. A ring rotor 10 is disposed in the concentric opening 27 formed by the jet ring. The outside diameter of ring rotor 10 is slightly less than the inside diameter of vortex chamber opening 27. When body portions 14 and 12 are assembled, an O-ring 23, a backplate 19, a spring 21, and a filter screen 22 are included to complete the assembly and support the jet ring within cavity 15 of the body section 14 of the flowmeter.

When a fluid enters inlet 9, it is directed into the jetways formed by grooves 24 and 25 and impinges on the outer periphery of rotor ring 10 essentially tangentially. The equal force around the chamber circumference causes rotor ring 10 to spin with a rate of rotation dependent upon the volume of flow of the fluid. Rotor 10 will therefore be suspended by the fluid within the vortex chamber opening 27. The fluid exhausts via outlet 17.

As more clearly seen in FIG. 2, ring rotor 10 includes reflective marks 11 which are preferably equally spaced around a face of ring rotor 10. An optical detector 16 is provided in body section 12 which detects light reflected from reflective areas 11 as the ring rotor 10 spins. An external electronic circuit produces an output waveform having a fundamental frequency directly proportional to the rate of rotation of the ring rotor 10 and, therefore, to the rate of flow of fluid through the flowmeter. The circuit is calibrated to display the flow rate.

As previously discussed, certain problems have occurred when the flowmeter type of FIG. 1 is used to measure small changes in flow rates. In FIGS. 3 and 4, recordings of a flowmeter having the noted problem are presented. In FIG. 3, a flow rate of 500 ml per minute is being monitored and which is carefully held constant. An accurate measurement 29 of flow is being obtained until time $t_1$ is reached at which point there is a sudden step change of the flow measurement to a lower value 30. As will be noted, the reading returns to normal and back to the erroneous reading intermittently. This behavior has been termed the intermittent mode.

FIG. 4 illustrates a second type of error in which there is a more gradual transition from the correct reading to an erroneous reading. It will be noted that the correct reading 29 begins to have a plurality of the changes of the type seen in FIG. 3 and the step changes become more dense and closely spaced until the reading stabilizes at a lower than normal value as indicated by trace 33.

The source of the problems represented by the recordings of FIGS. 3 and 4 appears to be a slight unbalance in the ring rotor 10 of the flowmeter causing it to have a fundamental mode and a mode in which a slight wobble occurs producing a reduction in rotational speed. The rotor thus has two states and will randomly change from one state to the other.

It has been found experimentally that increasing the instability of a rotor ring will cause the rotor to operate in the wobbling mode with no tendency to revert to the non-wobbling mode. Advantageously, calibration of the flowmeter then produces an accurate reading which remains constant over the flow rates of interest. Various methods may be used to slightly unbalance ring rotor 10. In FIG. 5, a ring rotor 30 is shown having the outer circumference with its radius $R_1$ centered at point 32 and the inside circumference with its radius $R_2$ centered at point 34. Thus, the outer circumference is not concentric with the inner circumference, thus producing the desired imbalance. Rotor 30 also includes reflective marks 31, as differentiated from non-reflective areas 30. Reflective marks 31 function essentially as reflective marks 11 in FIG. 2.

Figure 6:
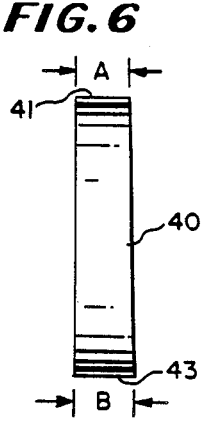
FIG. 6 is a side view of a ring rotor in accordance with the invention having a slight wedge shaped construction.

FIG. 6 shows a side view of an alternative construction of a ring rotor 40. The ring rotor faces are not parallel resulting in a first edge 41 having a dimension A which is slightly smaller than the opposite edge 43 having a dimension B.

Figure 7:
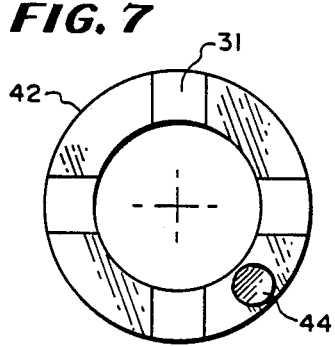
FIG. 7 is a plan view of a ring rotor having concentric inside and outside diameters with a weighting material applied to a face thereof.

FIG. 7 illustrates a method of producing the desired imbalance which is applicable to existing ring rotors. Rotor 42 has a spot of material 44 applied to one portion of a face of the rotor 42. Such material may be a suitable cement such as epoxy or the like. Rotor 32 also includes reflective marks 31, which function similarly to marks 31 and 11 in FIGS. 5 and 2 respectively.

Figure 8:
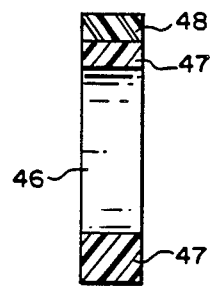
FIG. 8 is a cross-sectional view of a ring rotor in accordance with the invention showing the use of two different materials to provide an unbalance thereof.

Another approach is illustrated in FIG. 8 which is a cross-section of a ring rotor 46. The rotor 46 is formed primarily of a material 47 having a small amount of a different material 48 wherein the specific gravities of the two materials differ slightly.

Figure 9:
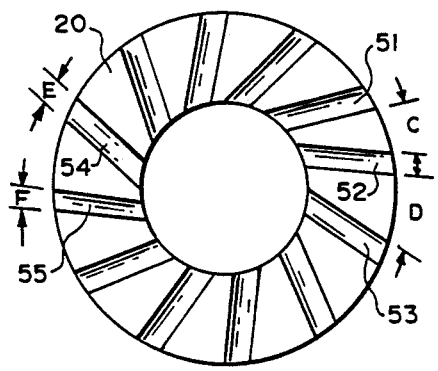
FIG. 9 is a plan view of one section of the vortex chamber and jetways in which the spacing and depth of the jetways have been varied.
Figure 10:
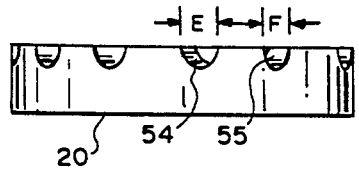
FIG. 10 is a side view of the vortex chamber portion of FIG. 9 showing the difference in depth of two of the jetways.

An alternative approach to causing the rotor to have a stable wobbling mode is illustrated in FIGS. 9 and 10. Here, the male jet ring 20 is shown having uniform jetway grooves 51. A slight instability in the rotor which will produce the wobble mode may be caused by a groove 55 of reduced width compared to the remainder of the grooves such as groove 54. Therefore, dimension F will be slightly less than dimension E producing a reduced diameter of the jetway formed thereby as best seen in FIG. 10. An alternative change in the jetways is also indicated in FIG. 9 in which the pitch of a jetway 52 is changed as will be seen with reference to grooves 51, 52, and 53. Dimension C is slightly less than dimension D, creating a jet of fluid striking the rotor at a slightly different angle than the remainder of the fluid jets. It is to be understood that these differences will be very small and are exaggerated in FIGS. 9 and 10 for illustrative purposes.

Various experimental versions of the present invention have been constructed and tested. Bearingless flowmeters which have exhibited the problem have been found to operate stably over the flow rates of interest.

Although certain specific rotor and jet ring designs which produce the desired stability of flow readings have been disclosed, it is to be understood that these are for exemplary purposes only and other variations in these elements may be used without departing from the spirit and scope of the invention.

We claim:

1. In a bearingless flowmeter for measuring fluid flow over a selected flow range, having a vortex chamber for positioning a rotor therein and having a plurality of angularly oriented jets spaced around the periphery of said chamber for producing a fluid vortex around said ring rotor, the improvement comprising:

means for introducing an instability in said ring rotor in said vortex chamber to produce a single mode of rotation of said ring rotor over the selected flow range, said single mode of rotation including wobbling of said rotor.

2. The improvement of claim 1 wherein said means consists of an imbalance of said rotor.

3. The improvement of claim 2 in which said rotor includes a weight added to a portion thereof for producing said imbalance.

4. The improvement of claim 2 in which said rotor is in the form of a ring having an outer circumference eccentric with an inner circumference thereof for producing said imbalance.

5. The improvement of claim 2 in which said rotor has a non-uniform thickness for producing said imbalance.

6. The improvement of claim 2 in which rotor is formed from nonhomogeneous material for producing said imbalance.

7. The improvement of claim 1, wherein said means consists of unequal spacing of said jets around said vortex chamber.

8. The improvement of claim 1 wherein said means consists of a variation in size of said jets.

9. In a bearingless flowmeter, for measuring fluid flow over a selected flow range, having a vortex chamber continuing a ring rotor and having a plurality of angularly oriented jets spaced around the periphery of said chamber for producing a fluid vortex around said ring rotor, said vortex causing said ring rotor to spin, a method of improving the stability of measurements within said selected range comprising the step of:

causing a constant instability in the spinning of said ring rotor.

10. The method of claim 9 in which said step includes producing a slight imbalance in said ring rotor.

11. The method of claim 9 in which said step includes producing a slight asymmetry in said fluid vortex.

12. The method of claim 10 in which said steps includes adding weight to a portion of said ring rotor.

* * * * *